United States Patent
Levchuk et al.

(10) Patent No.: US 8,655,822 B2
(45) Date of Patent: Feb. 18, 2014

(54) PROBABILISTIC DECISION MAKING SYSTEM AND METHODS OF USE

(75) Inventors: Georgiy Levchuk, South Grafton, MA (US); Jared Freeman, Bethesda, MD (US); Wayne Shebilske, Bellbrook, OH (US)

(73) Assignees: Aptima, Inc., Woburn, MA (US); Wright State University, Dayton, OH (US)

( * ) Notice: Subject to any disclaimer, the term of this patent is extended or adjusted under 35 U.S.C. 154(b) by 642 days.

(21) Appl. No.: 12/921,755

(22) PCT Filed: Mar. 11, 2009

(86) PCT No.: PCT/US2009/036865
§ 371 (c)(1),
(2), (4) Date: Sep. 9, 2010

(87) PCT Pub. No.: WO2009/114649
PCT Pub. Date: Sep. 17, 2009

(65) Prior Publication Data
US 2011/0016067 A1    Jan. 20, 2011

Related U.S. Application Data

(60) Provisional application No. 61/035,796, filed on Mar. 12, 2008.

(51) Int. Cl.
*G06F 17/00* (2006.01)
*G06N 5/02* (2006.01)
*G06F 15/18* (2006.01)
*G06N 5/04* (2006.01)

(52) U.S. Cl.
USPC .................... 706/46; 706/12; 706/60

(58) Field of Classification Search
None
See application file for complete search history.

(56) References Cited

U.S. PATENT DOCUMENTS

| 2002/0133391 | A1 | 9/2002 | Johnson |
| 2004/0015386 | A1 | 1/2004 | Abe et al. |
| 2006/0200333 | A1 | 9/2006 | Dalal et al. |
| 2006/0224535 | A1 | 10/2006 | Chickering |

OTHER PUBLICATIONS

Cassandra, A. (1998). A survey of POMDPS applications. American Association for Artificial Intelligence Symposium.*
Levchuk, G.M., Gildea, K., Freeman, J., Shebilski, W., Alakke, G. and Narakesari, S., Abstract for International Command and Control Research and Technology Symposium (ICCRTS) 2007, Title: Benchmarked Exper ent a System for Training (BEST), presented Jun. 19-21, 2007 n Newport RI.*

(Continued)

*Primary Examiner* — Kakali Chaki
*Assistant Examiner* — Daniel Pellett
(74) *Attorney, Agent, or Firm* — John J. Brooks, III

(57) ABSTRACT

Embodiments of this invention comprise modeling a subject's state and the influence of training scenarios, or actions, on that state to create a training policy. Both state and effects of actions are modeled as probabilistic using Partially Observable Markov Decision Process (POMDP) techniques. The POMDP is well suited to decision-theoretic planning under uncertainty. Utilizing this model and the resulting training policy with real world subjects creates a surprisingly effective decision aid for instructors to improve learning relative to a traditional scenario selection strategy. POMDP provides a more valid representation of trainee state and training effects, thus it is capable of producing more valid recommendations concerning how to structure training to subjects.

22 Claims, 9 Drawing Sheets

(56) References Cited

OTHER PUBLICATIONS

J. Yen, J. Yin, T. Ioerger, M. Miller, D. Xu, and R. Volz. CAST: Collaborative agents for simulating teamwork. In Proceedings of International Joint Conference on Artificial Intelligence, 2001.*

Jaakkola, T., Singh, S. P., Jordan, M. I. (1995) Reinforcement learning algorithms for partially observable Markov decision problems, NIPS 7, pp. 345-352.*

R. Nair, D. Pynadath, M. Yokoo, M. Tambe, and S. Marsella, "Taming decentralized POMDPs: Towards efficient policy computation for multiagent settings," in Proceedings of the Eighteenth International Joint Conference on Artificial Intelligence (IJCAI-03), 2003.*

N. Schurr, J. Marecki, J.P. Lewis, M. Tambe, and P.Scerri. The DEFACTO system: Training tool for incident commanders. In IAAI'05, 2005.*

Elliott, L.R., Cardenas, R., and Schiflett, S.G., 1999, Measurement of AWACS team performance in distributed mission scenarios. Available online at: http://www.dodccrp.org/1999CCRTS/pdf_files/track_3/013ELLIO.pdf (accessed Aug. 28, 2003).

Ericsson, K.A., 2002, Attaining excellence through deliberate practice: Insights from the study of expert performance. In the Pursuit of Excellence Through Education, M. Ferrari (Ed.), (Mahwah, NJ: Lawrence Erlbaum Associates, 2002).

Ericsson, K.A., 2004, Deliberate practice and the acquisition and maintenance of expert performance in medicine and related domains. Academic Medicine, 79, pp. S70-S81.

Ericsson, K.A., Krampe, R. TH., and Tesch-Romer, C., 1993, The role of deliberate practice in the acquisition of expert performance. Psychological Review, 700, p. 379 and p. 384.

Fahey, R.P., Rowe, A.L., Dunlap, K.L., and Deboom, D.O., 2000, Synthetic task design (1): Preliminary cognitive task analysis of AWACS weapons director teams. Technical Report. Brooks AFB, TX: Armstrong Laboratory.

Levchuk, G.M., Gildea, K., Freeman, J., Shebilski, W., Alakke, G. and Narakesari, S., Abstract for International Command and Control Research and Technology Symposium (ICCRTS) 2007, Title: Benchmarked Experiential System for Training (BEST), presented Jun. 19-21, 2007 in Newport RI.

Shebilski, W., Gildea, K., Freeman, J. and Levchuk, G., Abstract for Human Factors and Ergonomics Society (HFES) 2007 Conference, Title: Training Experienced Teams for New Experiences, presented at conference Oct. 1-5, 2007 in Baltimore MD.

* cited by examiner

PROBABILISTIC DECISION MAKING SYSTEM AND METHODS OF USE

CROSS-REFERENCE TO RELATED APPLICATIONS

This invention claims benefit of U.S. Provisional Patent Application No. 61/035,796 filed on Mar. 12, 2008 and entitled PROBABILISTIC DECISION MAKING PROCESS, the entire contents of which are herein incorporated by reference in their entirety.

STATEMENT REGARDING FEDERALLY SPONSORED RESEARCH OR DEVELOPMENT

This invention was made with Government support under Contract #FA9550-05-C-0101 awarded by U.S. Air Force. The Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

The subject invention generally relates to decision making. More particularly, the subject invention relates to decision making for team and individual training.

2. Background

Modern training simulation systems present a unique opportunity. Training designers can generate large libraries of experiential training treatments by systematically varying specific parameters that influence the challenge to trainees with respect to training objectives. When those training treatments are scenarios, instructors can choose from this vast library the scenario that is most appropriate to trainees at a given time. More dynamic versions of this vision include parameterized training, in which instructors specify scenario parameters prior to each training event, and adaptive training, which automatically adjusts parameters during training.

This is an opportunity in that it enables instructors to fit the training more tightly to the needs of trainees. It is a significant challenge, however, because it may be quite difficult for a human instructor to reliably predict which of many candidate scenarios will most rapidly advance trainees towards expertise. Given that a team has successfully executed some training scenario that presents a large number of targets and few threats (or some other configuration of these or other parameters), is it appropriate to select a scenario that increases targets while holding threats constant, increases threats while holding targets constant, increases both, or decreases both?

Instructors traditionally address this problem by exploiting instructional principles, such as the use of hierarchical part task training, in which each skill is taught until students achieve some standard of performance, and then the next is taught. Alternatively, computer-based training adapts training to the performance of students based on a fixed set of rules concerning which training conditions to apply given a student state.

Traditional solutions such as hierarchical part task training potentially take more training time to achieve a given level of student performance and/or achieve lower levels of performance given a maximum training time. Opportunities to accelerate and/or improve training effects are not exploited by these solutions.

Traditional solutions such as computer-based training fail when either the student state cannot be accurately judged (i.e., is probabilistic) or the effects of training conditions are uncertain, or both. This is frequently the case in complex domains, team training, and where the number of potential training conditions is large (as in simulation-based training).

BRIEF SUMMARY OF THE INVENTION

It is an object of embodiments of the invention to provide a computer based system for determining training treatments for a subject on a topic, the system comprises a memory to store at least one action comprising at least one training treatment, a processor capable of executing machine instructions and the machine instructions including means for executing a POMDP model to create a training policy to determine the at least one training treatment to train a subject on a topic.

It is a further object of embodiments of the invention to provide a system for determining training treatments for a subject wherein the subject is a team and the training treatments are training treatments for team training.

It is another object of embodiments of the invention to provide a system for determining training treatments for a subject wherein the means for executing a POMDP model further includes the POMDP model having a state, a transition function, a reward function, an observation and an observation function. In some of these embodiments, the state comprises a representation of an expertise state of the subject, the transition function comprises a representation of the probability of an expected changed expertise state of the subject after training the subject on the treatment, the reward function comprises a representation of an objective and a cost of training the subject on the treatment, the observation comprises a representation of a measure of the subject, and the observation function comprises a representation of the probability of an expected observation of the subject after training the subject on the treatment.

It is an object of embodiments of the invention to provide a system for determining training treatments for a subject where the representation of the state of expertise of the subject comprises a set of numbers representing the expertise state of the subject on the topic and the observation comprises a set of numbers representing the measures of the subject.

It is a further object of embodiments of the invention to provide a system for determining training treatments for a subject where the transition function comprises a probability of moving from the expertise state to the expected changed expertise state conditioned on the training treatment given to a subject, the reward function comprises at least one number, where each number represents a benefit of subject attaining the expertise state given the training treatment, and the observation function comprises the probability of an observation given the subject's expertise state and training treatment given to the subject.

It is another object of embodiments of the invention to provide a system for determining training treatments for a subject where the step of utilizing a POMDP model further includes creating a training policy by linking each state to a training treatment at a node and interconnecting each node to another node by at least one observation. In some embodiments, the step of utilizing a POMDP model further comprises applying the training policy by obtaining the state of the subject, selecting the node having that state and determining the linked training treatment at that node as the training treatment to train the subject on the topic.

It is an object of embodiments of the invention to provide a program storage device readable by a machine, tangibly embodying a program of instructions executable by the machine to perform the method comprising the step of generating a decision making policy from a POMDP model, where the POMDP model comprises a state parameter, an observation parameter and a action parameter, and the action parameter comprises training treatments. In some embodiments, the state parameter comprises the state of expertise of a subject and the at least one observation parameter comprises a measure of the expertise of the subject.

It is another object of embodiments of the invention to provide the program storage device wherein the step of generating a decision making policy further comprises defining the state parameter, the action parameter and the observation parameter, defining a plurality of functions comprising a transition function, an observation function and a utility function and generating the decision making policy based on said parameters and said functions.

It is a further object of embodiments of the invention to provide the program storage device that further includes the steps of determining a changed state of the subject after applying an action parameter, comparing the changed state of the subject to a process threshold, selecting the at least one action parameter from the decision making policy, applying the at least one action parameter to the subject, determining a new changed state of the subject, comparing the new changed state of the subject to the process threshold and repeating the steps of selecting the at least one action parameter, applying the at least one action parameter, determining a new changed state and comparing the new changed state until the process threshold is met.

It is an object of embodiments of the invention to provide a computer based method for structuring training treatments for a subject on a topic, said method comprising defining an action comprising at least one training treatment and utilizing a POMDP model to create a training policy to determine the training treatment to train the subject on a topic.

It is another object of embodiments of the invention to provide the a computer based method for structuring training treatments wherein the subject is a team and the training treatments are training treatments for team training.

It is a further object of embodiments of the invention to provide a method for structuring training treatments wherein the step of utilizing a POMDP model further comprises the POMDP model having a state, a transition function, a reward function, an observation and an observation function.

It is yet another object of embodiments of the invention to provide a method of structuring training treatments wherein the state comprises a representation of an expertise state of the subject, the transition function comprises a representation of the probability of an expected changed expertise state of the subject after training the subject on the treatment, the reward function comprises a representation of an objective and a cost of training the subject on the treatment, the observation comprises a representation of a measure of the subject, and the observation function comprises a representation of the probability of an expected observation of the subject after training the subject on the treatment.

It is another object of embodiments of the invention to provide a method of structuring training treatments wherein the representation of the state of expertise of the subject comprises a set of numbers representing the expertise state of the subject on the topic, the observation comprises a set of numbers representing the measures of the subject, the transition function comprises a probability of moving from the expertise state to the expected changed expertise state given the training treatment given to a subject, the reward function further comprises at least one number where each number represents a benefit of subject attaining the expertise state given the training treatment, and the observation further comprises the probability of an observation given the subject's expertise state and training treatment given to the subject.

It is a further object of embodiments of the invention to provide a method of structuring training treatments wherein the step of utilizing a POMDP model further comprises creating a training policy by linking each state to at least one training treatment at a node and interconnecting each node to another node by an observation and the step of utilizing a POMDP model can further comprises applying the training policy by obtaining the state of the subject, selecting the node having that state and determining the linked training treatment at that node as the training treatment to train the subject.

BRIEF DESCRIPTION OF THE SEVERAL VIEWS OF THE DRAWING

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention is illustrated by, but by no means limited to, the following description of various embodiments.

Embodiments of this invention comprise modeling a subject's state and the influence of training scenarios, or actions, on that state to create a training policy. Both state and effects of actions are modeled as probabilistic using Partially Observable Markov Decision Process (POMDP) techniques. The POMDP is well suited to decision-theoretic planning under uncertainty. Utilizing this model and the resulting training policy with real world subjects creates a surprisingly effective decision aid for instructors to improve learning relative to a traditional scenario selection strategy. POMDP provides a representation of trainee state and training effects by explicitly recognizing their uncertainty, thus it is capable of producing more valid recommendations concerning how to structure training to subjects. Testing Results Achieved from one embodiment is described below.

In embodiments, the POMDP captures the dynamic nature of team and individual skills via the Markov decision process graph. Within the graph, a single finite discrete variable indexes the current team expertise state, and external actions control expertise changes. The state changes approximate the dynamics of the team expertise when the model applies a specific control action to a team. In our context, a control action corresponds to selecting a training treatment to train specific skills. A training treatment may be a mission scenario, a training objective, or training technique (e.g., presenting problems, explaining principles). Expertise changes are described by a table of transition probabilities that statistically represent the uncertain effect on expertise of selecting a specific training treatment for a team.

The POMDP addresses the problem of partial observability of the true state of team expertise. While observations about team and individual performance influence our belief about achieved team skills, the actual or "true" state of skills is not observable. Thus, we can only estimate the expertise state, interpreting it as "partially observable".

The POMDP solution represents trainee state and the effects of training treatments as probabilistic. Traditional solutions treat these as known, though in many circumstances (described above) they cannot be known with certainty. POMDP provides a more valid (i.e., probabilistic) representation of trainee state and training effects, thus it is capable of producing more valid recommendations concerning how to adapt training to trainees.

The POMDP model also allows us to treat training treatment selection as both the control mechanism to change the skills and the testing mechanisms to obtain more knowledge of the true skills state.

Figure 1:
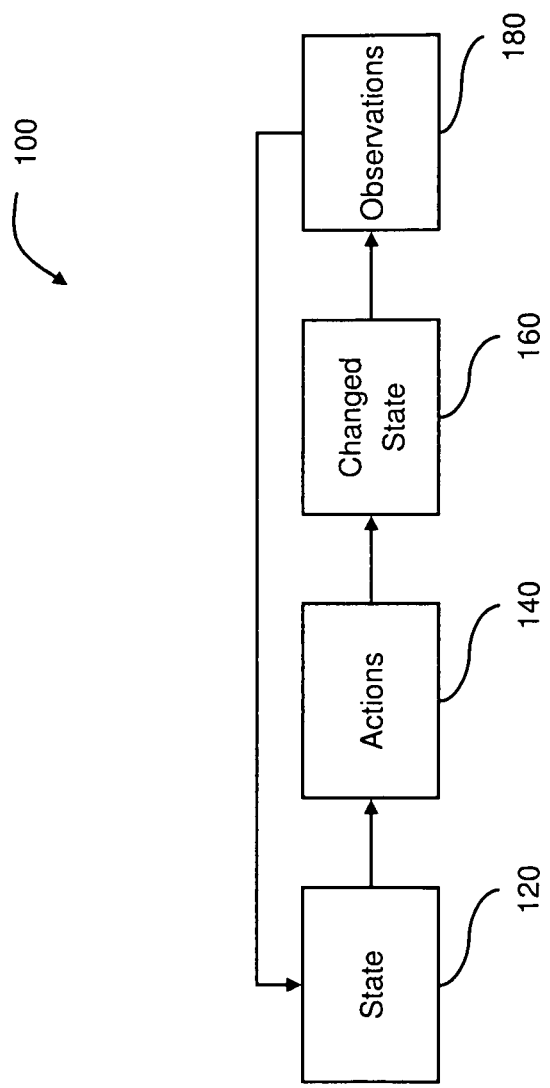
FIG. 1 is a graphic showing one embodiment of a conceptual POMDP model.

Developing a Decision making System with the POMDP Model:

FIG. 1 illustrates the concept of one embodiment of a POMDP decision making system 100. This embodiment of the POMDP decision making system utilizes a POMDP model having the following variables:
  a finite set of states, S;
  a finite set of control actions, A;
  a finite set of observations, Z;
  a state transition function, $\tau$: $S \times A \rightarrow \Pi(S)$, where $\Pi(\cdot)$ is the probability distribution over some finite set;
  an observation function, o: $S \times A \rightarrow \Pi(Z)$; and
  an immediate reward function, r: $S \times A \rightarrow R$.

With these variables, as shown in FIG. 1, various actions 140 are selected and applied to subjects to try to change their state 120. After this action 140 is applied, observations 180 are made of the subject to try to determine their changed state 160. Knowing this changed state 160, or approximating this state with a belief state, subsequent actions can be selected based on a decision making policy. This policy determines the action to be applied to the subject. This policy can also determine the observations that may reflect the state of the subject and it can also predict the effect of the actions on the subject.

Because the variables of this model can be quantified, the process described above can also be pre-populated with variables and functions that are expected to reflect the variables, the subjects and the objectives to come out of the process. The results of pre-populating a POMDP model is generally described herein as a "policy". As will be described below, this policy can be used as a decision making tool.

The System Parameters:

The state is the way the subject currently exists and an action will have the effect of changing the state of the subject. The set of states of the subject would represent every possible way the subject could exist. Each of these states would be a state in a MDP or POMDP. In one embodiment of the invention, the set of states S represents all possible states of the expertise of the subject. The subject can be an individual, a team, a team of teams or expertise. Embodiments of state include, but are not limited to individual skills, team skills and game position. A state is defined such that the subject can be in only one state at a given time.

Control actions, or actions, represent the set of possible alternative choices you can choose to make. In one embodiment of the invention, the actions set A represents all of the available training/testing treatments. Other embodiments of actions include, but are not limited to training scenarios, training objectives, training techniques, game moves, organizational decisions, rewards and punishments.

In one embodiment, the observations set Z consists of all possible observations about a subject, that is, all possible values of normalized performance and process measures such as but not limited to test results, observations of tasks or other measures intended to approximate the subjects' state. Other embodiments of observations include but are not limited to skills, game position and location.

The System Functions:

The functions are used to define how the above parameters change throughout the process.

The state transition function $\tau$ models the uncertainty in the evolution of expertise states (learning). The transitions specify how each of the actions might change the state of the subject. In embodiments, the transition function is a representation of the probability of an expected changed expertise state of the subject after training the subject.

The observation function o relates the observed measures to the true underlying expertise state and treatment selection actions and specifies what possible observations may be obtained and how they are influenced by the true expertise state and action in the model. In embodiments, the observation function comprises a representation of the probability of obtaining the observation for each state and action in the model.

The immediate utility of performing an action in each of the true states of the environment is given by the immediate reward function r—which can incorporate a cost of training and a benefit of attaining expertise.

The utility model quantifies the objective of the training and is described using expected cost-reward function $$E\left[\sum_{t=1}^{K} \gamma^t r[t]\right] = E\left[\sum_{t=1}^{K} \gamma^t r(s[t], a[t])\right]$$

where K is the number of time steps of actions allowed (including infinite horizon learning with K=$\infty$), r[t] is a reward obtained at time step t, and $\gamma \in (0,1]$ is a discounting rate controlling how much future rewards count compared to current rewards (i.e., the smaller this rate, the more initial training gains valued compared to ones obtained later).

Assuming that $s_t, a_t$ are correspondingly expertise state and applied instructional action (treatment) at time t, the single time-step reward is calculated as r[t]=r(s[t],a[t]), where r($s_t$, $a_k$) is equal to the reward of transitioning to expertise state $s_j$ using instructional action (treatment) $a_k$.

Figure 2:
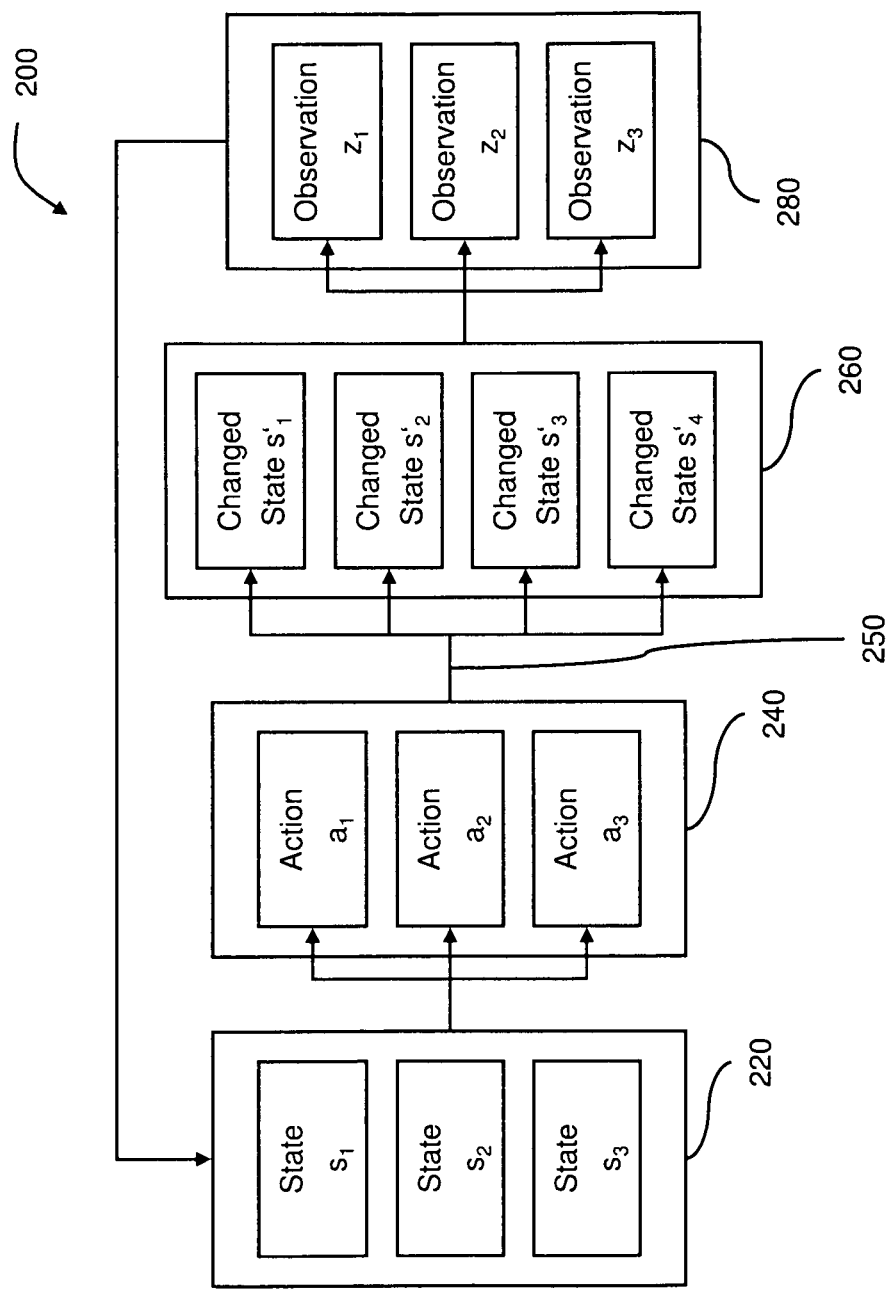
FIG. 2 is a graphic showing one embodiment of the decision making system illustrating the plurality of variables.

The System Parameters and Functions in POMDP Model:

A general, an overview of one embodiment of a POMDP model is shown in FIG. 2. As illustrated, the model 200 reflects the iterative process of starting with one of a set of states 220, determining one of the set of actions 240 to be applied to change the state of the subject to one of a set of changed states 260 and then selecting one of a set of observations 280 of the subject to try to identify the subject's changed state 260. Once this is done, the process can start all over again.

Representations of team expertise can be represented in a state-action model, see FIG. 2, equivalent to Markov Decision Process (MDP) graph, where the instructional actions change the team expertise with some uncertainty. The state-action model is uniquely described with a set of team expertise states S 220, a set of selectable training treatments, or actions A 240, and state transition function $\tau$ 250. That is, if $S=\{s_1, s_2, \ldots, s_N\}$ and $A=\{a_1, a_2, \ldots, a_M\}$, then transition function $\tau$: $S \times A \rightarrow \Pi(S)$ defines the probability $\tau(s_i, a_k, s_j)=\Pr\{s_j|s_i,a_k\}$ that team expertise will change to a changed state $s_j$ if treatment $a_k$, such as scenario instruction, is applied when team expertise is in state $s_i$. Note that the model represents the uncertain effect of instructional actions, such that $$\sum_{j=1}^{N} Pr\{s_j | s_i, a_k\} = 1.$$

Figure 3:
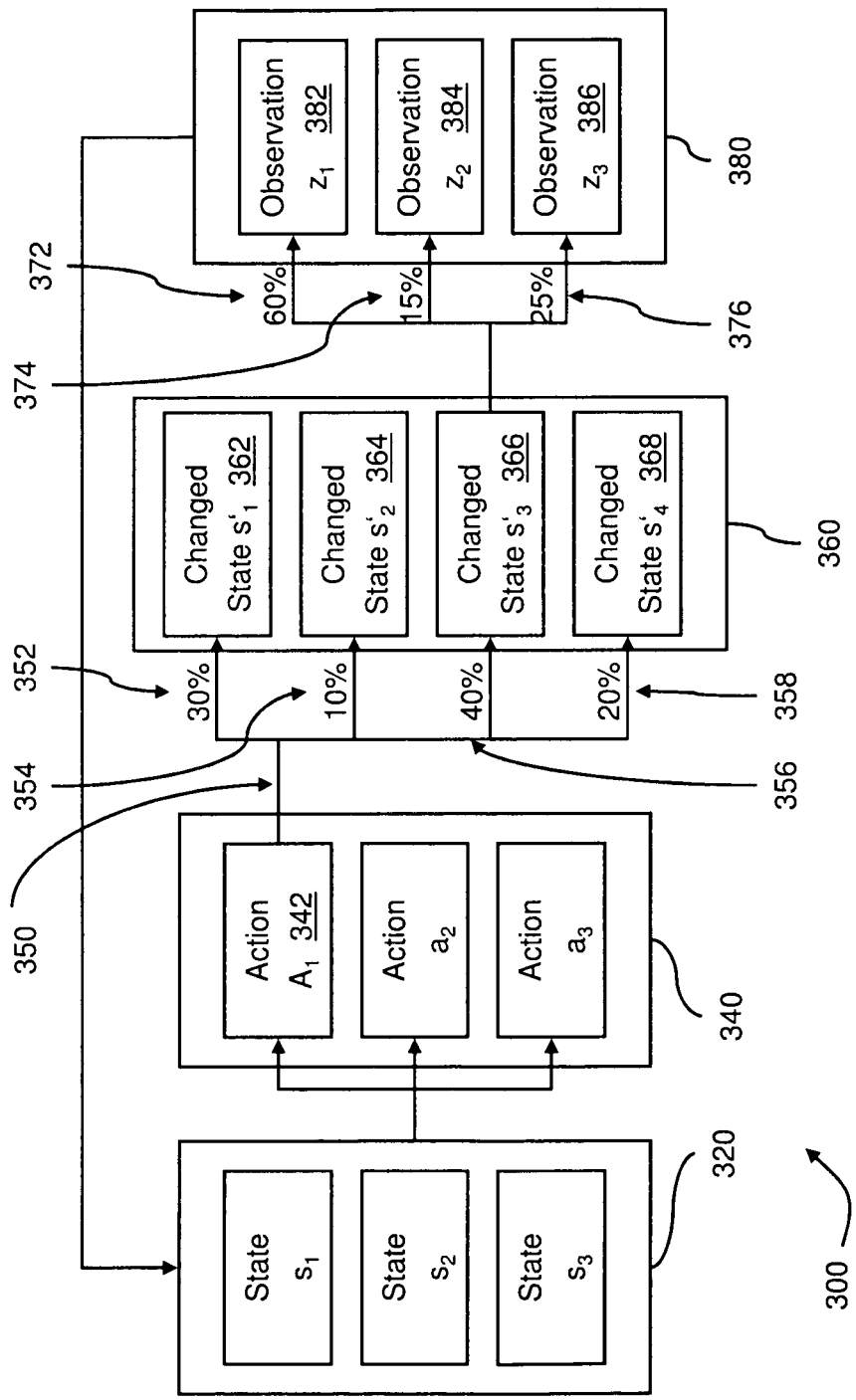
FIG. 3 is a graphic showing one embodiment of the decision making system illustrating the plurality of variables and the interconnection of selected variables by selected functions.

Referring to FIG. 3 the state-action model 300 shows an example of how the transition and observation functions are used in the model. As shown in FIG. 3, the application of actions 320 can affect the subject's expertise to create a changed state 360. The transition functions 350 represent the probability of achieving a specific changed state 360. For example, if the subject is a state and action 342 is applied, there are multiple probabilities that changed states may occur. Represented in general by the transition function 350, the different probabilities are represented as 30%, 10%, 40% and 20%, elements 352, 354, 356 and 358 respectively. Each of these probabilities are associate with the expected state 360 that will be achieved. For example, there is a 30% probability that state 362 will be achieved, a 10% probability that changed state 364 will be achieved and a 20% probability that changed state 368 will be achieved. Similarly, the observation function 380 relates the probability of an observation being tied to a state, or changed state 360 of a subject. An example of this relationship is graphically shown in FIG. 3 where the probabilities of 60%, 15% and 25%, elements 372, 374 and 376 respectively, represent the probability of observations 382, 384 and 386 respectively, to reflect the changed state of the subject as changed state 366.

Figure 4B:
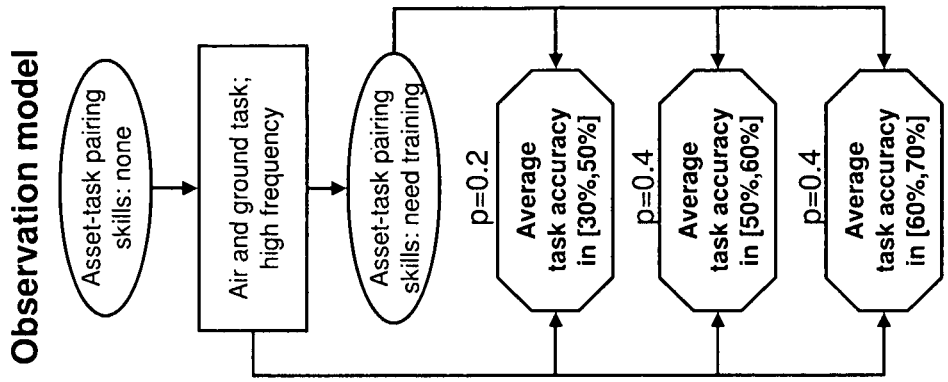
FIGS. 4A-4B are graphics showing one embodiment of the decision making system illustrating the interconnection of selected variables by selected functions.
Figure 4A:
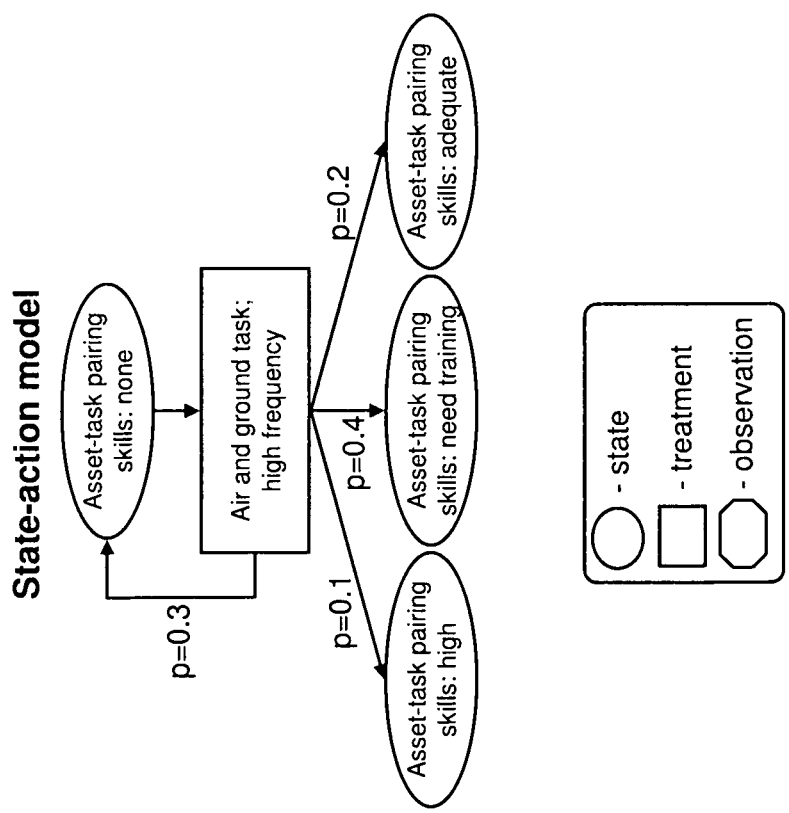

Another example of these relationship are shown in FIGS. 4A-4B. Referring to FIG. 4A the state-action model shows an example of how the controlled instructions of the trainer can affect the dynamics of the team expertise. For example, if the team does not have any skills in pairing assets (such as weapons) to tasks (such as enemy targets), then training a subject on a training treatment containing air and ground task classes with high appearance frequency would have 30% probability of achieving a changed state of having no effects, 10% probability of achieving a changed state of high level of skills, 40% probability of acquiring a changed state of some skills for which training is required, and 20% probability that a changed state of adequate skills is achieved. The assigned probabilities reflect the transition function of that action to create that changed state. Although it is not shown, it is understood that there are n number of changed states and the set of actions associated with changed states and states are not identical. Referring to FIG. 4B, the observation model shows an example of how observations from the average task accuracy measure are related to the selection of treatments (represented as task classes and task frequencies) and the true state of expertise resulting from executing a new treatment. For example, there is a 60% probability that average task accuracy observation will range from 60% to 70%, given that the training treatment contained air and ground task classes with high appearance frequency and that the team achieves some asset-task pairing skills that require training. Although it is not shown, it is understood that there are n number of observations and the set of observations associated with changed states, states and actions are not identical.

Figure 5:
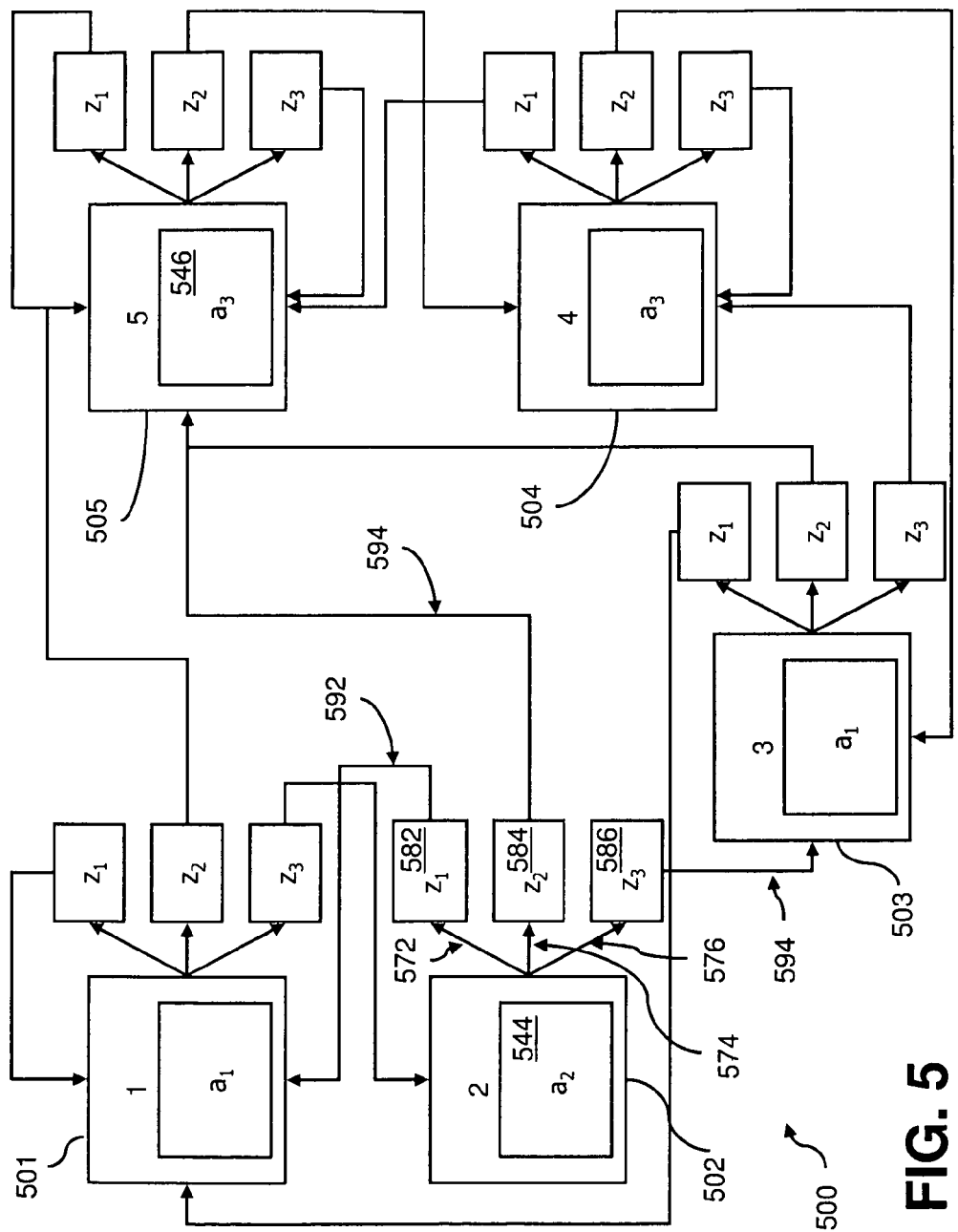
FIG. 5 is a graphic representation of the interrelationships of one embodiment of a policy.

Generating a Decision making Policy:

The POMDP model represents a set of interrelationships and is used to derive a decision making policy to include structuring training treatments. As used throughout this description a decision making policy is an interrelationship of states, actions and observations that can be used to structure decision making. In one embodiment, an example of which is shown in FIG. 5, POMDP solution is represented as a deterministic transition graph, in which the nodes, 501, 502, 503, 504 and 505, correspond to the beliefs about the true state of the expertise and are associated with the training action. For example, node 502 corresponds to action 544 and node 505 corresponds to action 546. The transitions between the nodes occur between application of the training treatments and are based on the received observations from previous training. For example, after action 544, observations 582, 584 and 586 are received at 572, 574 and 576 respectively and have transitions 592, 594 and 594 respectively. Each directed edge in the graph in FIG. 5 corresponds to a feasible observation that could be received. When the training controller transitions the policy graph to a new state, such as node 505 from transition 594, the corresponding training action, such as 546, is selected to be given to trainees for the next training experience. The policy graph is designed by POMDP solution algorithms to achieve the greatest amount of expected utility (expected reward of training) over some number of decision steps (training events).

If the states of expertise were observable (such as in Markov Decision Problems), this policy could be specified as a training action to be performed at the currently attained state of expertise s. The policy can be described as a stationary (time-independent) training $\pi(s) \in A$ or non-stationary (time-dependent) training $\pi_t(s) \in A$. In case of stationary training, which is used when the number of training events is assumed unlimited, $\pi(s)$ is the training treatment to be applied at the currently attained state of expertise s, and it results in the expected reward to be obtained using this policy ("value function") which can be written as:

$$V_\pi(s) = E\left[\sum_{t=1}^{\infty} \gamma^t r(s[t], a[t]) \Big| \pi\right]$$
$$= E\left[\sum_{t=1}^{\infty} \gamma^t r(s[t], \pi(s[t]))\right]$$
$$= r(s, \pi(s)) + \gamma \sum_{s'} V_\pi(s') \tau(s, \pi(s), s')$$

The value function $V_\pi(s)$ for policy $\pi$ is the unique simultaneous solution to the above set of linear equations.

The non-stationary training, used when the number of training events is constrained, is defined as an action/treatment $\pi_t(s)$ to be applied at state s at time (training event step) t, and it results in the expected reward to be obtained using this policy ("value function") which can be written as:

$$V_{t,\pi}(s) = E\left[\sum_{t=1}^{K} \gamma^t r(s[t], \pi(s[t]))\right]$$
$$= r(s, \pi_t(s)) + \gamma \sum_{s'} V_{t+1,\pi}(s')\tau(s, \pi_t(s), s')$$

As envisioned in a training situation, the true states that team expertise takes over time (that is, states of MDP) are not known to the trainer or the instructional model. They obtain only partial observations about current state of expertise in the form of observations from performance and/or process measures. The observation-state relationships are captured using the observation part of the model, as shown in FIG. 4, described by the state set, action set, and observation function o. That is, if the set of measure outcomes is $Z=\{z_1, z_2, \ldots, z_L\}$, then an observation function defines the probability $\Pr\{z_j|s_i, a_k\}$ that a normalized performance/process measure outcome $z_j$ is obtained when instruction action $a_k$ (a treatment) is applied and team expertise transitions to state $s_i$. Sometimes, this probability reflects the dependence of measures on only the true expertise state, that is, the probability $\Pr\{z_j|s_i\}$.

Figure 6:
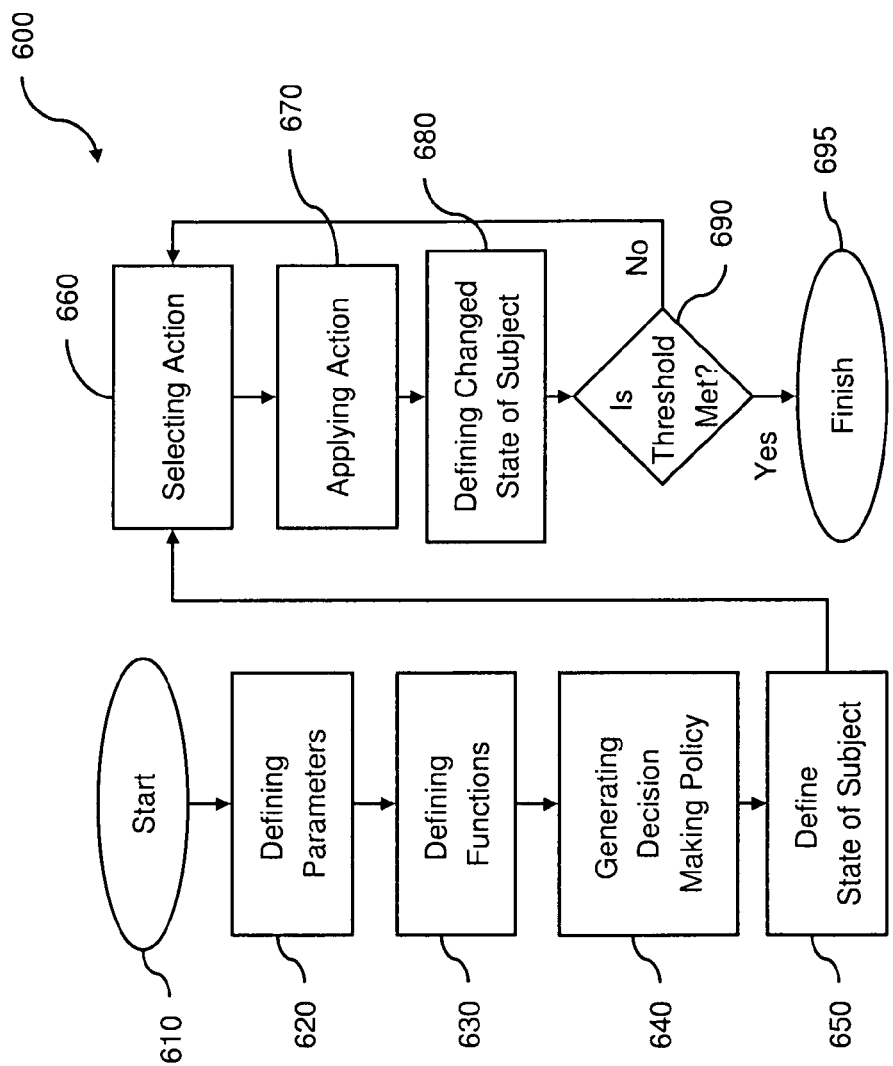
FIG. 6 is a process diagram showing one embodiment of the methods of invention.

As shown in FIG. 6, this decision making policy is generated by the steps of defining the parameters 620 after start 610, defining the functions 630 and running the POMDP model 640. These steps are described in more detail below.

Use of the Decision making Policy:

With the decision making policy, the system can include testing, measuring or other observations systems to provide the information that will allow a state to be determined which will in turn define the actions necessary. An example of this would include the use of the policy in the decision making system described below.

Operational Use of One Embodiment of the Decision making System:

For illustration purposes and not for limitation, the following description outlines an operational use of the POMDP decision making system for the situation of training teams using a set of training scenarios as the training treatment and human teams as the subjects of the training. It is understood that the methods and systems disclosed have wide applications for any decision making systems or situations where a policy can be defined ahead of time. Such additional applications for use of the disclosed systems and methods include but are not limited to: deciding directions for equipment such as robots or cars where the actions are movements and observations are characteristics of the location; deciding multi-player negotiation options where the actions are player negotiation positions and observations are reactions of the players; and deciding team characteristics of virtual game where the actions are game options and observations are the reactions of the game and/or players.

Population/Definition of the Parameters:

Parameters for the POMDP model, i.e. feasible observations, actions, and expertise states are defined by experts and bound by training objectives or other constraints on the process and system.

States of expertise are defined by experts based on training objectives and the bounds on feasible complexity of the solution. That is, different decomposition of continuous space of team expertise into a set of discrete expertise states is possible, and the decomposition to be used in the training solution can be customized to the training domain. For example, and not for limitation, the set of states for a POMDP model related to training would be populated with a finite set of variable that define directly or reference a state of the subject. Examples of this as applied to training situation include, but are not limited to statements of the subject's expertise, percentage attainment of certain skills and other reflections of the subject's state of expertise in a topic. A topic can be a subject area, a set of subject areas or a set of requirements. The end result is a set of states.

Actions are defined by experts based on a range of actions that are available to influence the state of expertise. For example, and not for limitation, the set of actions for a POMDP model related to training would be populated with the finite set of actions representing the set of training scenarios possible to be given to the subjects. The end result is a set of pre-defined actions that can be applied to the subject.

Observations are pre-defined and are related to measures that can be collected during the experiments. For example, and not for limitation, the set of observations for a POMDP model related to training would be populated with a finite set of measures such as test results from the subject. The observations may or may not relate to state of the subject. The end result is a set of observations.

Population/Definition of the Functions:

Functions for POMDP model, i.e. observation and state transition probabilities and rewards, can be defined by experts based on their knowledge of the environment and team training trends.

The observation function and state transition function can be obtained by experts based on their knowledge of the effect of training on subject's states and on the expert's knowledge of how observations may, or may not, relate to the state of the subject. These experts can use their knowledge to allocate statistical values and probabilities as needed by these functions. These functions can also be obtained by statistical models using the averages of state transitions know from the previously conducted experiments. This requires the experiments and teams to be labeled with the true state, which often is not available. In the latter case, the statistical learning algorithms (such as expectation maximization) can be used to derive the observation function and state transition function. For example and not for limitation, the observation function for a POMDP model related to training would be populated with percentage values of how related a specific observation may related the actual state of a subject. The end result is a set of probabilities relating observations to states and changed states. For example and not for limitation, the state transition function for a POMDP model related to training would be populated with probabilities of states changing given a specific training scenario. The end result is a set of probabilities relating actions to expected changed states.

The reward function is based on the objective of the training to gain a certain level of expertise in a team and cost of training. For example and not for limitation, the reward function for a POMDP model related to training would be populated with numerical representation of an objective. In one embodiment, the reward function is populated with –1's, 0's and 1's, where a reward for the desired expertise states are equal to 1 and rewards for undesired states are equal to –1, while rewards for other states are equal to 0. The end result is a set of rewards with a value for each state and training action.

Generating the Decision Making Policy:

The decision making policy can be created by iterating through the sets of states, actions and observations using the defined functions. This iteration can be performed through the use of several mathematical models and algorithms as described below. As the variables increase, such as representing states of multiple variables as a vector, the model should be carefully built and configured.

At the start of applying the POMDP model, as a result of partial observability, the decision making system at time t+1 does not know the current state s[t+1] of the team's expertise/knowledge. Instead, the system knows the initial belief of the expertise state (prior information about the team from its assessment) the history of observations $z^{t+1}=\{z[1], z[2], \ldots, z[t+1]\}$ and the system's own actions $a^t=\{a[1], a[2], \ldots, a[t]\}$. The system can act optimally on this information by conditioning the training policy on its current belief about the state of the team expertise/knowledge at every time step. The belief state at time t is represented as a vector of probabilities $b[t]=(b_1[t], b_2[t], \ldots, b_N[t])$, where $b_i[t]$ is equal to the probability that state of the team's knowledge is $s_i$ at time $$t\left(\sum_{i=1}^{N} b_i[t] = 1\right).$$

Then, the belief is updated as $$b[t+1]=\beta(b[t],a[t],z[t+1])$$

where individually the probabilities are updated:

$$b_i[t+1] = \eta \cdot o(s_i, a[t], z[t+1]) \sum_j b_j[t] \tau(s_j, a[t], s_i)$$

Here, $\eta$ is normalization constant.

Then the POMDP-based scenario training policy is defined on the belief state, so that we specify the training scenario $\pi(b) \in A$ to be performed at belief state b, which is updated over time as $b[t+1]=\beta(b[t],a[t],z[t+1])$. As the result, the expected reward for policy $\pi$ starting from belief state b is defined to be $$V_\pi(b) = E\left[\sum_{t=1}^{\infty} \gamma^t r(s[t], a[t]) \middle| b, \pi\right]$$

$$= \sum_j b_j r(s_j, \pi(b)) + \gamma \sum_z V_\pi(\beta(b, \pi(b[t]), z)) Pr(z \mid \pi(b[t]), b)$$

Here, belief-observation component $Pr(z|a,b)$ is found as $$Pr(z \mid a, b) = \sum_{i,j} b_j \cdot o(s_j, a, z) \cdot \tau(s_j, a, s_i)$$

For a stationary policy, we will have:

$$V_{t,\pi}(b) = \sum_j b_j[t] \cdot r(s_j[t], \pi(b[t])) +$$

$$\gamma \sum_z V_{t+1,\pi}(\beta(b[t], \pi(b[t]), z)) \sum_{i,j} b_j[t] \cdot o(s_j, \pi(b[t]), z) \cdot \tau(s_j, \pi(b[t]$$

Due to the large size of the belief state space, the optimal policy to maximize the value function $V_\pi(b_0)$, where $b_0$ is initial belief about the state of team's knowledge or expertise, cannot be derived using conventional means. Currently, problems of a few hundred states are at the limits of tractability (Smith and Simmons, 2004). This is due to the fact that most exact algorithms for general POMDPs use a form of dynamic programming, which has a computational explosion in the belief state space (Cassandra, Littman, and Zhang, 1997). Still, these algorithms provide a useful finding that a value function can be given by a piece-wise linear and convex representation and transformed into a new such function iteratively over time.

Several algorithms for dynamic-programming (DP) updates have been developed, such as one pass (Sondik, 1971), exhaustive enumeration (Monahan, 1982), linear support (Cheng, 1988), and witness (Littman, Cassandra, and Kaelbling, 1996). Out of these algorithms, the witness algorithm has been shown to have superior performance (Littman, Cassandra, and Kaelbling, 1996). Combining the benefits of Monahan's enumeration and witness algorithms, an optimal algorithm called incremental pruning has been developed in (Zhang and Liu, 1996) and enhanced in (Cassandra, Littman, and Zhang, 1997).

Figure 7:
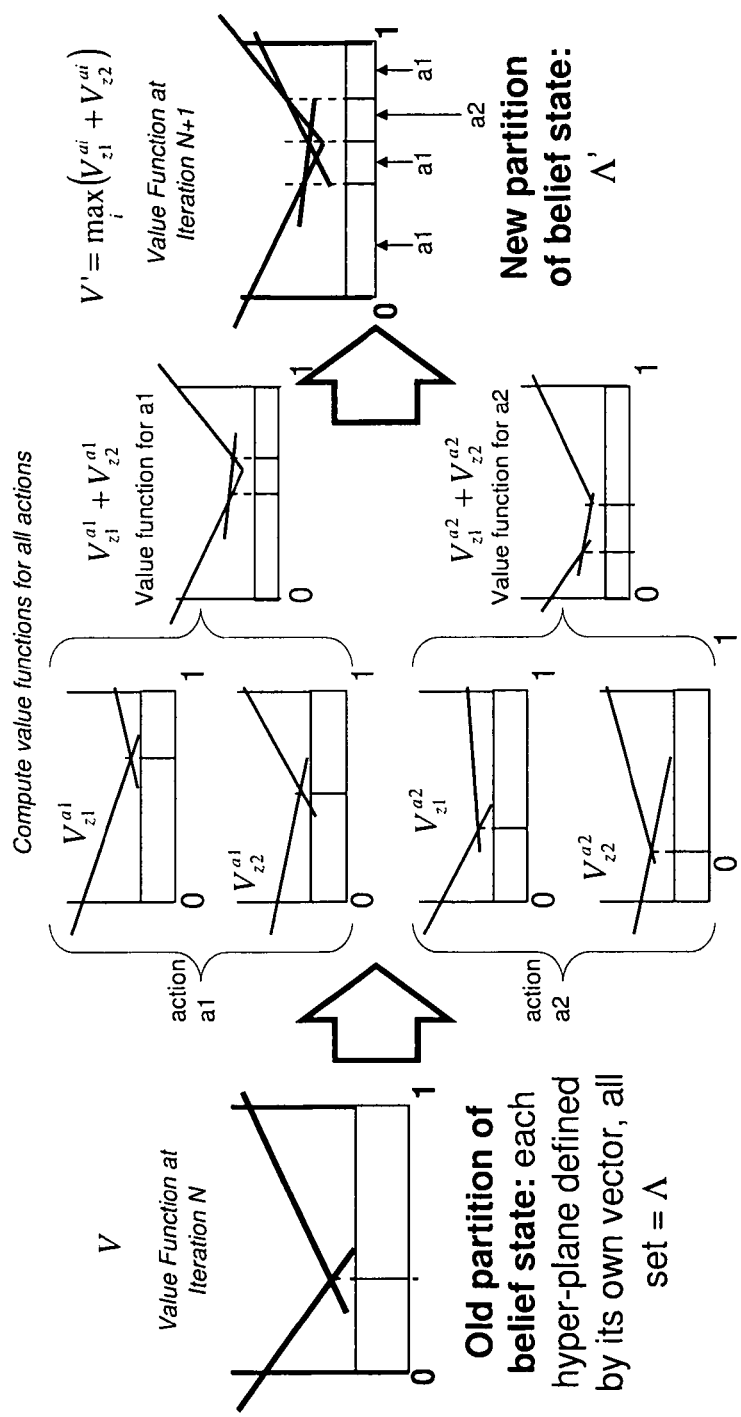
FIG. 7 is a functional diagram of the machine instructions of one computer based embodiment of the invention.

The fundamental idea of the DP update is to define the new value function V' in terms of the given (current) value function V. By viewing a value function as a mapping from the belief state about team knowledge to the expected reward of training, the solution is found by improving this mapping over time. This approach is called value iteration because the new single-step update produces value function V' that is closer to the optimum value function than previous V. The update is performed as follows:

$$V'(b) = \max_{a \in A}\left(\sum_j b_j r(s_j, a) + \gamma \sum_z V(\beta(b, a, z)) Pr(z \mid a, b)\right)$$

$$= \max_{a \in A} \sum_z \left(\frac{\sum_j b_j r(s_j, a)}{|Z|} + \gamma V(\beta(b, a, z)) Pr(z \mid a, b)\right)$$

$$= \max_{a \in A} \sum_z V_z^a(b)$$

where $V_z^a(b) = \dfrac{\sum_j b_j r(s_j, a)}{|Z|} + \gamma V(\beta(b, a, z)) Pr(z \mid a, b)$ The above transformation is relatively simple (Cassandra, Littman, and Zhang, 1997) and preserves the piecewise linearity and convexity of the value function. This means that if the function V can be expressed as a maximum over a finite set $\Lambda$ of vectors $$V(b) = \max_{\alpha \in \Lambda} b \cdot \alpha$$

then we can express $$V_z^a(b) = \max_{\alpha \in \Lambda_z^a} b \cdot \alpha$$

and the new value function as $$V'(b) = \max_{\alpha \in \Lambda'} b \cdot \alpha$$

for some finite set of vectors $\Lambda', \Lambda^a_z$. The sets $\Lambda, \Lambda', \Lambda^a_z$ have unique representation of minimum size (Littman, Cassandra, and Kaelbling, 1996). FIG. 7 highlights an example of one iteration of the value function update for a 2×2 size problem (number of expertise states=number of actions=number of observations=2). FIG. 7 shows how the space (between 0 and 1 in this example) of beliefs about the true team expertise state (=0 or 1 in this example) is separated into the regions where the same action (training) needs to be applied, and that this separation is updated over time. Note that complexity of the belief state space split does often decreases over time for some iterations (Kaelbling, Littman, and Cassandra, 1998).

The algorithms mentioned above differ in the approach for constructing the vector sets $\Lambda, \Lambda', \Lambda^a_z$. For example, Monahan's exhaustive enumeration considers every action and belief vector for each observation, and is therefore computationally prohibitive. One Pass algorithm of Sondik (1971) starts with an arbitrary belief point, constructs the vector for that point and then defines a set of constraints over the belief space where this vector is guaranteed to be dominant. In this algorithm, defined regions are extremely conservative, and might generate same vector for many belief points. Linear support algorithm (Cheng, 1988) uses a similar idea to One Pass algorithm but uses fewer constraints. This algorithm picks a belief point, generates the vector for that point and then checks the region of that vectors to see if it is the correct one at all corners (vertices) of the region. If not, it adds the vector at that point and checks its region. If the value function is incorrect, the biggest difference will occur at a corner; therefore, if we generate all possible region corners, we are assured of not missing any solutions.

The Witness algorithm (Littman, Cassandra, Kaelbling, 1996) also uses the same idea as in One Pass algorithm; however, it does not consider all actions at all times. In addition, the Witness algorithm considers only one observation at a time and concentrates on finding the best value function for each action separately. Once it finds these it will combine them into the final V' value function. Finding a belief point where the current observation's choice could be changed, just gives us a witness to the fact that there is a point where we can do better. We can then take this point and generate the real best vector for it (taking into account all the observation choices).

The Incremental Pruning algorithm (Zhang, Liu, 1996) combines elements of Monahan's enumeration and the witness algorithms. This algorithm constructs sets of vectors for each action individually and then focuses on every observation one at a time. The algorithm finds all different combinations of future strategies, while not using the region calculation.

To overcome the solution complexity of optimal algorithms, efficient approximate solutions to POMDP have been proposed (Littman, Cassandra, and Kaelbling, 1995). These algorithms are based on the use of belief state-action function $$Q_a(b) = \max_{\alpha \in \Lambda^a} b \cdot \alpha$$

for which $$V(b) = \max_a Q_a(b)$$

The algorithms utilize the update of the sets of vectors α using replicated Q-learning or linear Q-learning (Littman, Cassandra, and Kaelbling, 1995). The linear Q-learning update can be seen as the update of the vectors during the search in belief state:

$$\Delta\alpha_a(s) = \mu b(s)\left(r + \gamma \max_{a'} Q_{a'}(b') - \alpha_a \cdot b\right)$$

$$\alpha_a = \alpha_a + \sum_j \Delta\alpha_a(s_j)b_j$$

(where μ is the update rate).

Another approximate technique is a Heuristic Search Value Iteration (HSVI) algorithm proposed in (Smith, and Simmons, 2004). This is an anytime algorithm that returns an approximate policy and a provable bound on its error with respect to optimal policy. HSVI combines two well-known techniques: attention-focusing search heuristics and piecewise linear convex representations of the value function. On some of the benchmarking problems, HSVI displayed over 100 times improvement in solution time compared to state of the art POMDP value iteration algorithms (Smith, and Simmons, 2004). In addition, HSVI was able to solve problems 10 times larger that those reported previously. The HSVI algorithm finds an approximate solution by recursively following a single path down the search tree of the belief-action state space until satisfying a termination condition based on the error specification. It then performs a series of updates on its way back to initial belief point.

Another algorithm for fast POMDP solution is an internal-state policy-gradient algorithm (Aberdeen, 2003). It was shown to solve the problem with tens of thousands of possible environment states in reasonable time (30 minutes). This algorithm approximates the optimal POMDP solution as the finite-state stochastic controller, in which the actions are selected via a stochastic parameterized policy μ(a|θ,g,z) equal to the probability of taking action a ∈A given observation z ∈Z, where g ∈G is the internal state of the controller, and θ is the set of parameters. The controller's internal states change from g to h probabilistically after each observation z is received using state transition probabilities ω(h|φ,g,z). The policy gradient algorithm finds the coefficients (φ,θ) using the update rule:

$$\phi_{k+1} = \phi_k - \alpha_k \nabla\eta(\phi_k,\theta_k); \theta_{k+1} = \theta_k - \beta_k \nabla\eta(\phi_k,\theta_k)$$

where $\nabla\eta(\phi,\theta)$ is the gradient of the long-term average reward function $$\eta(\phi, \theta) = \lim_{T \to \infty} \frac{1}{T} E_{\phi,\theta}\left[\sum_{t=0}^{T} r(i_t)\right].$$

These iterations are performed to maximize $\eta(\phi,\theta)$ over parameters (φ,θ). The computation of the gradient estimate to replace $\nabla\eta(\phi,\theta)$ is the main challenge in finding the solution to POMDP.

The parameterization of functions ω(h|φ,g,z) and μ(a|θ,g,z) in terms of parameters (φ,θ) can be different and will result in different algorithms. In (Aberdeen, 2003) the soft-max functions were used to generate the distributions from real-valued output of a function approximator in the form of an artificial neural network. More specifically, the functions were defined as:

$$\omega(h \mid \phi, g, z) = \frac{\exp(\phi_{goh})}{\sum_{h' \in G} \exp(\phi_{goh'})};$$

$$\mu(a \mid \theta, g, z) = \frac{\exp(\theta_{hoa})}{\sum_{a' \in A} \exp(\theta_{hoa'})}$$

Here, the parameters $\phi_{goh}, \theta_{hoa}$ can be stored either in the look-up tables updated via the gradient method above, or using the artificial neural network (ANN). The gradient $\nabla\eta(\phi, \theta)$ can be expressed as $\nabla\eta(\phi,\theta)=\pi'(\nabla P)[I-P+e\pi']^{-1}r$.

Here, $P(\phi,\theta)$ is a $|S||G|\times|S||G|$ transition matrix of environment-controller pairs states with entries $$p(j, h \mid i, g, \phi, \theta) = \sum_{z,a} o(z \mid i)\omega(h \mid \phi, g, z)\mu(a \mid \theta, g, z)\tau(j \mid i, a).$$

This matrix has a unique stationary distribution $\pi(\phi,\theta)$ (a vector of size $|S||G|$ for all environment-controller state pairs, and $$\sum_{\substack{s \in S \\ i \in G}} \pi_{s,i}(\phi, \theta) = 1))$$

such that $\pi'(\phi,\theta)\cdot P(\phi,\theta)=\pi'(\phi,\theta)$. Also e is a vector of all "1s" of size $|S||G|$, hence $e\pi'$ is a $|S||G|\times|S||G|$ matrix of $\pi'(\phi,\theta)$ in each row. In the above, $r(i,g)=r(i)$, $\forall g \in G$—the function of reward of reaching training expertise state $i \in S$.

The approximation of the gradient can be obtained using the following:

$$\nabla\eta \approx \nabla_n\eta = \pi_n'(\nabla P)x_n$$

$$\pi_{n+1}' = \pi_n'P$$

$$x_{n+1} = x_n + w_{n+1}, x_0 = r$$

$$w_{n+1} = Pw_n$$

Typical complexity, given the sparse matrices, is $O(\text{const}|S||G||A|(n_\phi+n_\theta))$.

Note that this requires the knowledge of P, which in turn requires knowing the "environment dynamics". When it is not known, we can use reinforcement learning approaches to iteratively update the $(\phi,\theta)$ together before each action is taken.

Use of Utility/Value Function:

The model can be made to stop iterating when a threshold is met such as stopping when no improvement in the objective function of expected reward is obtained. A utility function can be used that describes the benefit of gaining specific expertise by the team. A cost function can be used to define the cost of training and scenario setup required for a specific experiment. A value function can describe the overall expected future reward of the training policy applied at a given state, where the reward is calculated based on probabilities of being in different states of expertise in the future based on the training conducted using the policy, the benefits of those states, and the costs of conducting training experiments.

FIG. 7 shows how the value function approximation is conducted iteratively using the assessments of possible future actions (training experiments) and the states of expertise that a team could achieve. In FIG. 7 we show a 1-parameter (problem with 2 states of expertise, 2 training scenario actions, and 2 observations; hence belief state space can be represented with a single variable—a probability of state 0 which is between 0 and 1) expected value function estimate at iteration N on the left hand side, which is a piece-wise linear function with support areas for each linear component represented as an interval in the range between 0 and 1. We can see how the space (between 0 and 1 in this example) of beliefs about the true team expertise state (=0 in this example) is separated into the regions where the same action (training) needs to be applied, and that this separation is updated over time. Note that complexity of the belief state space split does often decreases over time for some iterations.

The Resulting Decision making Policy:

The training policy obtained from the POMDP decision making system is described as an interrelated policy graph, matrix or a look-up table that describes this interrelationship of variables and functions. The policy is a finite state controller which consists of the policy nodes, where each policy node has an action (training scenario) associated with it. Policy nodes represent a subspace of beliefs about the true state of the team's expertise. The transition between policy nodes occurs based on corresponding observations received after the training experiment using the scenario is conducted.

FIG. 5 shows a simple example of a training policy 500 where the squares indicate policy nodes such as 501, 502 and 503, and the nodes inside them correspond to the actions, such as 544, that are taken in those nodes. Transitions are indicated by the arrows with the observations which triggers them such as 592, 594 and 596. An example of how the policy works can be followed by the node 1. With node 502, action a2 544 is performed. After this action is performed, an observation is made. If observation z2 584 is made, the policy makes the decision that node 5 505 should be the next node selected which has action a3 546. The action a3 546 is performed resulting in an observation and the related node and action is again followed. The process is repeated until a threshold is met.

Define State of Subject to Start Application of Decision making Policy:

In a training domain, the true states that team expertise takes over time (that is, states of MDP) are not known to the trainer or the instructional model. They obtain only partial observations about current state of expertise in the form of performance and/or process measures. The observation-state relationships during training are captured using the training policy.

The training policy obtained by solving POMDP results in a tailored decision path for different teams, because it employs the observed performance measurements on each team. Using the POMDP policy graph, a trainer picks a starting node (initial assessment of the team knowledge), executes the instructional scenario associated with the current node, receives the performance measures (observation) on the team, selects an instructional scenario (transitions to the next node) based on the observation, and then repeats. The training process is repeated until the node is reached without any outgoing transition links or until a threshold is met.

Referring to FIG. 6, the steps of the process 600 that pertain to the application of the decision making process to subjects comprises the steps of defining the belief state of a subject

650, selecting an action from the decision making policy 660, applying that action 670, defining the new belief state of the subject 680, determining whether a threshold is met 690 and if the threshold is met, finishing the process 695. If it is determined that the threshold is not met in step 690, the steps of 660, 670, 680 and 690 are repeated until the threshold is met. A more detailed description of each of these steps is included below.

Selecting Actions Based on Training Policy:

In FIG. 5 the squares indicate policy nodes, and the nodes inside them correspond to the actions that are taken in those nodes. Transitions are the links in this graph labeled with the observations which triggers them.

Referring again to the process of FIG. 6, at step 650, the user (team trainer) identifies the belief state closely representing the current state of expertise of the team, and picks corresponding node in the policy.

Applying Actions:

Step 660 comprises identifying the action associated with the initial state from step 650. Then with step 670, the first training is administered to a team based on the action associated with this node. Applying the action from the policy is equivalent to conducting the training for the team corresponding to the scenario described in this action. Different scenarios can exist, varying by training duration, complexity of the experiment, the internal experiment objectives, types of targets and their frequencies, experimental domain, etc.

Defining Changed State of the Subject by Observing Subjects:

After training on the scenario corresponding to selected policy action, the observations about team's performance are obtained as step 680. These observations consist of measures of process and performance of the team. Based on what observations are obtained, the next policy node is selected.

Observations are equivalent to collecting the measures of the performance and processes of the team during its execution of the training scenario. Such measures may include number and types of targets killed, delays in information sharing and target prosecution, communication patterns among team members, the workload of team members, etc.

The changed states of team expertise correspond to the nodes in the policy graph. Policy nodes represent a subspace of beliefs about the true state of the team's expertise. Therefore, when the policy moved to one node from the other, this indicates that the team expertise could be in a certain range, but independent of specific expertise quantities the same training should be applied to the team.

Comparing New Belief State to Threshold:

Although not always required, step 690 comprises comparing the state to a threshold to determine when to stop iterating through the process.

In some embodiments of the process 600, one of the ways to define the belief subspace is to use the concept of thresholds. These are limiting values on the specific beliefs about the state of the expertise. For example, the belief subspace can be defined as "high expertise achieved with probability between 50% and 80%". The thresholds of 50% and 80% define the boundaries of the subspace.

It is useful to consider the thresholding at the initialization, when the starting node in the policy graph is selected to initialize training. Comparison of the belief about team expertise to the thresholds in each policy node allows identifying what belief subspace the current team expertise belongs to, and accordingly start the training from this policy node.

Stopping the Process:

The training is finished at step 695 when a node is reached with no outgoing transition links, or when the training time deadline is reached.

The policy node with no outgoing transition links indicates that the state of the expertise for a team has been reached that satisfies original training objectives. This is embedded in the POMDP solution and calculation of the original policy graph.

The time deadline can be reached even if the training objectives might not be achieved. In this case, the training must be stopped. The team expertise that is declared will correspond to the belief subspace of the final policy node.

Testing Results Achieved:

Laboratory experiments were conducted to evaluate the POMDP solution against a control condition: hierarchical part-task training.

Table 1 shows that the POMDP protocol, which adapted scenario selection to the performance of the team, assigned scenarios with different difficulty levels (number of time-sensitive targets (TSTs) and Treats) than those predetermined in the Control protocol. The average TO3 accuracy for the scenarios in the beginning (3&4), middle (5), and end (6&7) were 2.7, 3.8, and 3.1 for the POMDP protocol and 1.48, 3.00, and 2.30 for the Control protocol. We did not test these differences because the difficulty levels were different and we had no predictions about them.

TABLE 1

Difficulty Levels in Phase III Practice for POMDP and Control Protocols

| Scenario | Control | | POMDP | |
| --- | --- | --- | --- | --- |
| | TST | Threat | TST | Threat |
| 3 Early Practice | 11 | 33 | 10 | 35 |
| 4 Early Practice | 12 | 33 | 11 | 40 |
| 5 Middle Practice | 12 | 35 | 11 | 40 |
| 6 Late Practice | 12 | 40 | 12 | 45 |
| 7 Late Practice | 12 | 45 | 12 | 45 |

The skill level during early training was higher than we had anticipated causing a ceiling effect during Phase II. Specifically, the mean accuracy for TO3 increased from 2.9 to 3.5, as predicted, but the increase was not significant ($t(34)=1.38$, $p>0.05$). In contrast, the ratings of TO3 accuracy were sensitive measures between Phases II and III, and within Phase III and they supported our predictions. The ceiling effect in Phase II was due to high performance on the pretest.

Figure 8:
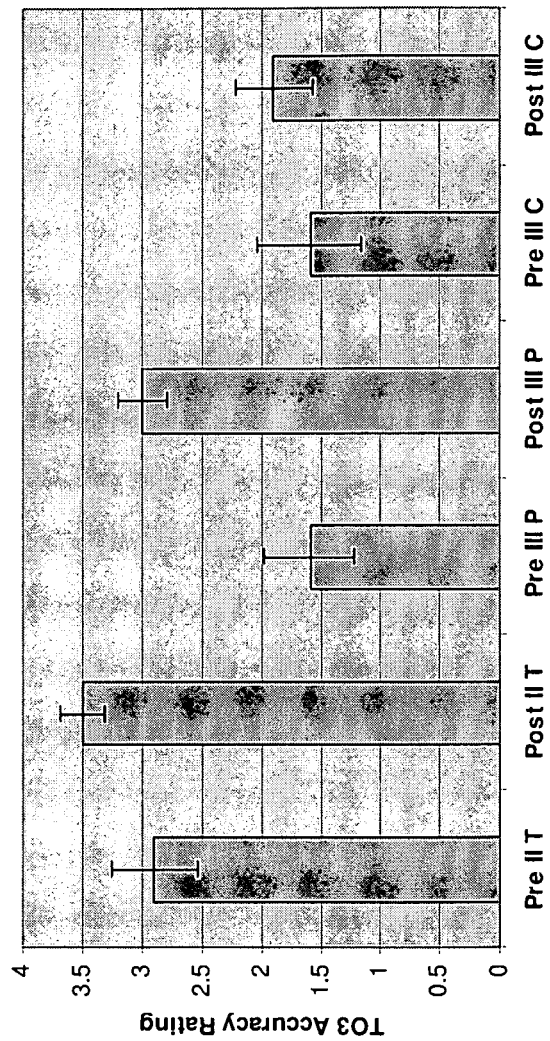
FIG. 8 is a graphic representation of the results of one embodiment of the invention.
Figure 9:
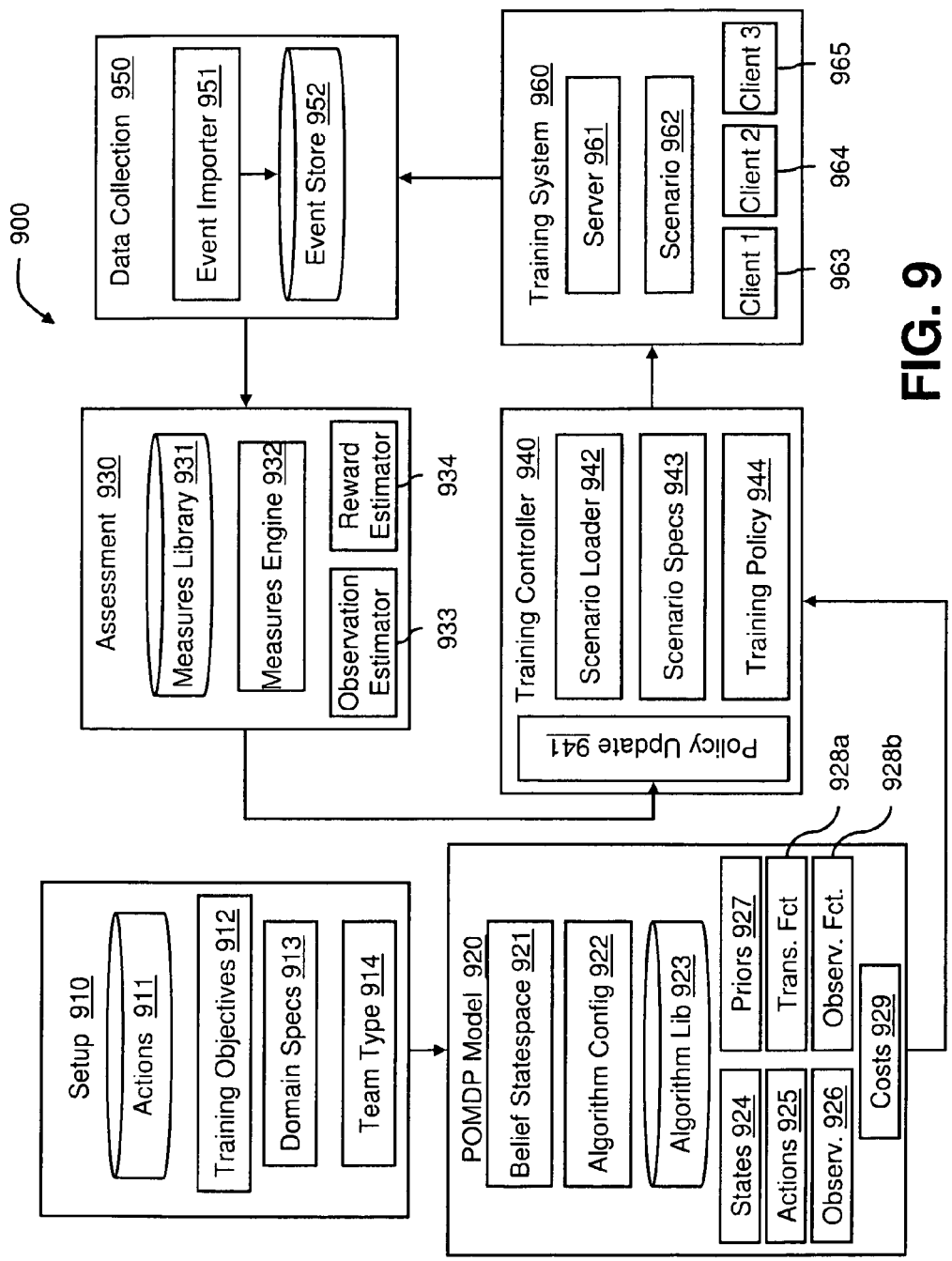
FIG. 9 is a functional diagram of one embodiment of machine instructions of one embodiment of a decision making system.

As FIG. 9 illustrates teams learned the complex task being trained (PreII T→PostII T, $p<0.01$); that administration of new and challenging problems (i.e., far transfer) degraded performance (PostII T→Pre III P & C, $p<0.01$); (3) that, on far transfer problems, teams in hierarchical part-task condition (control) did not reliably learn (PreIII P→PostIII P, $p>0.05$), while those in the BEST/POMDP condition did learn (PreIII C→PostIII C, $p<0.01$). We used SPSS to compute means and conduct conservative t-tests that do not assume equal variance. These statistics follow. Between the posttest in Phase II and the POMDP pretest in Phase III, the TO3 accuracy decreased significantly from 3.5 to 1.6 ($t(26)=4.38$, $p<0.01$). On the POMDP posttest, TO3accuracy rose significantly from 1.6 on the pretest to 3.0 on the posttest ($t(31)=3.11$, $p<0.01$). Between the POMDP posttest and the new challenge for the Control Pretest, performance fell from 3.0 to 1.6 ($t(27)=2.83$, $p<0.01$). On the Control protocol Posttest, the slight rise from 1.6 to 1.9 was not significant ($t(34)=0.48$, $p>0.05$). Note that the standard errors for the posttests were consistently smaller than those for the pretests FIG. 8 shows mean accuracy ratings for training objective 3 (TO3) for their sets of pretests and posttests for Phase II training (II T), Phase III POMDP Protocol (III P), and Phase III Control Protocol (III C). The figure illustrates (1: PreII T→PostII T) that teams learned the complex task being trained (p<0.01); (2: PostII T→PreIII P & C) that administration of novel problems (i.e., far transfer) degrades performance (p<0.01); (3) that, on far transfer problems, (PreIII P→PostIII P) teams in hierarchical part-task condition (control) do not reliably learn (p>0.05), while (PreIII C→Post III C) those in the BEST/POMDP condition do (p<0.01).

Description of a Computer Based Embodiment:

The described systems, methods, and techniques described may be implemented in digital electronic circuitry, computer hardware, firmware, software, or in combinations of these elements. Apparatus embodying these techniques may include appropriate input and output devices, a computer processor, and a computer program product, or machine instructions tangibly embodied in a machine-readable storage device for execution by a programmable processor. A process embodying these techniques may be performed by a programmable processor executing a program of machine instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A functional diagram of one embodiment of the machine instructions that create a decision making system 900 is shown in FIG. 9. FIG. 9 comprises the software modules: setup 910, POMDP model 920, assessment 930, training controller 940, data collection 950 and training system 960.

The setup module 910 is used to define variables used in the process such as, but not limited to the set of training actions 911, objectives 912 (used to define the rewards in POMDP model), domain specification 913, and possibly a type of the team to be trained 914. It is understood that different POMDPs can be defined for different types of teams.

The POMDP model module 920 is used to define the POMDP model and develop the solution policy. POMDP model consists of states of expertise 924, which in one embodiment can be defined by the user, the set of actions 925 (defined from the training scenarios), feasible observations 926 (based on the measures of process and performance using during the training process), and functions 928*a* and 928*b*, including the prior probability 927, state transition probability, observation probability, and cost functions 929. POMDP model module includes an algorithm configurator 922 and a library of POMDP solution algorithms 923, all of which generate the POMDP solution policy but may find solution in different ways (e.g., trading off the complexity and use of memory with optimality). The POMDP solutions internally rely on definitions of belief state space 921 (example of the statespace update is illustrated in FIG. 4).

The assessment module 930 generates the observation and reward estimations using the measures engine 932, the observation estimator 933 and the reward estimator 934. This engine takes as inputs the training vignette event flow and computes a set of measures (possibly time-dependent) using the measures library 931. These measures are selected from the training objectives and defined manually by the user. The assessment module feeds the observations and rewards into training controller module 940.

The training controller module 940 stores and updates the training policy 944. It is used for the selection of the next training scenario for the team through the scenario loader 942. It can update the training policy using the policy update function 941. Training policy allows this component to obtain the specs 943 of the training scenario for the next training session for the team, and use this specification to retrieve the actual training scenario vignette to give to the trainees.

The data collection module 950 is setup to extract and import the events from the training simulation with the event importer 951 and store these events in the event store 952.

The training system module 960 can be a virtual environment presented from a server 961 or any other method of training the subjects. It takes as inputs the training scenario from the training controller 940, provides the training to the team through a scenario subsystem 962, and generates the event stream corresponding to the training experiences. The training system can comprise a system with multiple clients, 963, 964 and 965.

This invention is not limited to the methods and systems described in the embodiments above. The methods of this invention are easily incorporated into computer systems and data networks that allow certain steps of these methods, such as input and output, to be performed on client machines connected to a computer network while the computational steps and data set storage can be done through a server in a client server model or other distributed computing architecture. It is also envisioned that the methods can be used over a wireless computer network to include wireless computers, wireless phones or other wireless data network.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

What is claimed is:

1. A computer based system for determining training treatments for a subject, said system comprising:
 a memory to store at least one action comprising at least one training treatment;
 a processor capable of executing machine instructions;

the machine instructions including means for executing a Partially Observable Markov Decision Process (POMDP) model to create a training policy to determine the at least one training treatment to train a subject on a topic;

the means for executing a POMDP model further comprises the POMDP model having at least one state, at least one transition function, at least one reward function, at least one observation and at least one observation function;

the at least one state comprises a representation of an expertise state of the subject;

the at least one transition function comprises a representation of the probability of an expected changed expertise state of the subject after training the subject on the at least one training treatment;

the at least one reward function comprises a representation of at least one objective and at least one cost of training the subject on the at least one training treatment;

the at least one observation comprises a representation of a measure of the subject;

the at least one observation function comprises a representation of the probability of an expected observation of the subject after training the subject on the treatment;

the machine instructions further including a process threshold comprising a measure of a changed state of the subject; and the machine instructions further including means for iterating steps of training the subject, obtaining the at least one observation and applying the training policy to select the at least one training treatment until the process threshold is met.

2. The system of claim 1 wherein the subject is a team and the at least one training treatments comprises at least one training treatments for team training.

3. The system of claim 1 wherein the representation of the state of expertise of the subject comprises a set of numbers representing the expertise state of the subject on the topic.

4. The system of claim 1 wherein the observation comprises a set of numbers representing the measures of the subject.

5. The system of claim 1 wherein:

the transition function representation of the expected changed expertise state of the subject further comprises a probability of moving from the expertise state to the expected changed expertise state conditioned on the training treatment given to a subject;

the reward function representation of the objective further comprises at least one number, where each number represents a benefit of subject attaining the expertise state given the training treatment; and the observation function representation of the expected observation of the subject further comprises the probability of an observation given the subject's expertise state and training treatment given to the subject.

6. The system of claim 1 wherein the means for executing a POMDP model further comprises creating the training policy by linking each state to the at least one training treatment at a node and interconnecting each node to another node by at least one observation.

7. The system of claim 6 wherein the means for executing a POMDP model further comprises applying the training policy by obtaining the state of the subject, selecting the node having that state and determining the linked training treatment at that node as the training treatment to train the subject on the topic.

8. The system of claim 7 further comprising:

after the step of applying the training policy to determine the training treatment, training the subject on the training treatment;

obtaining the observation for the subject; and applying the training policy to select the interconnected node and the changed state of the subject based on the observation, and determine a next training treatment to train the subject.

9. A non-transitory program storage device readable by a machine, tangibly embodying a program of instructions executable by the machine to perform the method steps comprising:

generating a decision making policy from a Partially Observable Markov Decision Process (POMDP) model;

the POMDP model comprising at least one state parameter, at least one observation parameter and at least one action parameter;

the action parameter comprising a training treatments;

the at least one state parameter comprises the state of expertise of a subject and the at least one observation parameter comprises a measure of the expertise of the subject;

iterating steps of training the subject, obtaining the at least one observation parameter and applying the decision making policy to select the training treatment until a process threshold is met; and the process threshold comprising a measure of a changed state of expertise of the subject.

10. The non-transitory program storage device of claim 9 wherein the step of generating a decision making policy further comprises:

defining the at least one state parameter, the at least one action parameter and the at least one observation parameter;

defining a plurality of functions comprising at least one transition function, at least one observation function and at least one utility function; and generating the decision making policy based on said parameters and said functions.

11. The non-transitory program storage device of claim 9 further comprising;

determining the changed state of the subject after applying an action parameter;

comparing the changed state of the subject to the process threshold;

selecting the at least one action parameter from the decision making policy;

applying the at least one action parameter to the subject;

determining a new changed state of the subject;

comparing the new changed state of the subject to the process threshold; and repeating the steps of selecting the at least one action parameter, applying the at least one action parameter, determining a new changed state and comparing the new changed state until the process threshold is met.

12. A computer based method for structuring training treatments for a subject on a topic, said method comprising:

defining at least one action comprising at least one training treatment;

utilizing a Partially Observable Markov Decision Process (POMDP) model to create a training policy to determine the at least one training treatment to train a subject on a topic;

the step of utilizing a POMDP model further comprises the POMDP model having at least one state, at least one transition function, at least one reward function, at least one observation and at least one observation function;

the at least one state comprises a representation of an expertise state of the subject;

the at least one transition function comprises a representation of the probability of an expected changed expertise state of the subject after training the subject on the at least one training treatment;

the at least one reward function comprises a representation of at least one objective and at least one cost of training the subject on the at least one training treatment;

the at least one observation comprises a representation of a measure of the subject;

the at least one observation function comprises a representation of the probability of an expected observation of the subject after training the subject on the treatment;

iterating steps of training the subject, obtaining the at least one observation and applying the training policy to determine the at least one training treatment until a process threshold is met; and the process threshold comprising a measure of a changed state of the subject.

13. The method of claim 12 wherein the subject is a team and the at least one training treatment comprises at least one training treatment for team training.

14. The method of claim 12 wherein the representation of the state of expertise of the subject comprises a set of numbers representing the expertise state of the subject on the topic.

15. The method of claim 12 wherein the observation comprises a set of numbers representing the measures of the subject.

16. The method of claim 12 wherein:

the transition function representation of the expected changed expertise state of the subject further comprises a probability of moving from the expertise state to the expected changed expertise state conditioned on the at least one training treatment given to a subject;

the reward function representation of the objective further comprises at least one number, where each number represents a benefit of subject attaining the expertise state given the at least one training treatment; and the observation function representation of the expected observation of the subject further comprises the probability of an observation given the subject's expertise state and the at least one training treatment given to the subject.

17. The method of claim 12 wherein the step of utilizing a POMDP model further comprises creating the training policy by linking each state to the at least one training treatment at a node and interconnecting each node to another node by at least one observation.

18. The method of claim 17 wherein the step of utilizing a POMDP model further comprises applying the training policy by obtaining the at least, one state of the subject, selecting the node having that at least one state and determining the at least one training treatment linked at that node as the at least one training treatment to train the subject on the topic.

19. The method of claim 18 further comprising:

after the step of applying the training policy to determine the at least one training treatment, training the subject on the at least one training treatment;

obtaining the at least one observation for the subject; and applying the training policy to select the interconnected node and the changed state of the subject based on the observation, and determine a next training treatment to train the subject.

20. The system of claim 1 wherein the expertise state represents the expertise of the subject in pairing weapons to enemy targets.

21. The non-transitory program storage device of claim 9 wherein the state of expertise of the subject represents the expertise of the subject in pairing weapons to enemy targets.

22. The method of claim 12 wherein the expertise state represents the expertise of the subject in pairing weapons to enemy targets.

* * * * *